Dec. 6, 1966   G. STAVIS   3,290,505
PHOTOSENSITIVE LUNAR TRACKER USING RADIAL
SCANNING AND FIBER OPTICS
Filed Dec. 17, 1962   4 Sheets-Sheet 1

INVENTOR.
GUS STAVIS

BY *H. I. Macher*

ATTORNEY.

INVENTOR.
GUS STAVIS

INVENTOR.
GUS STAVIS

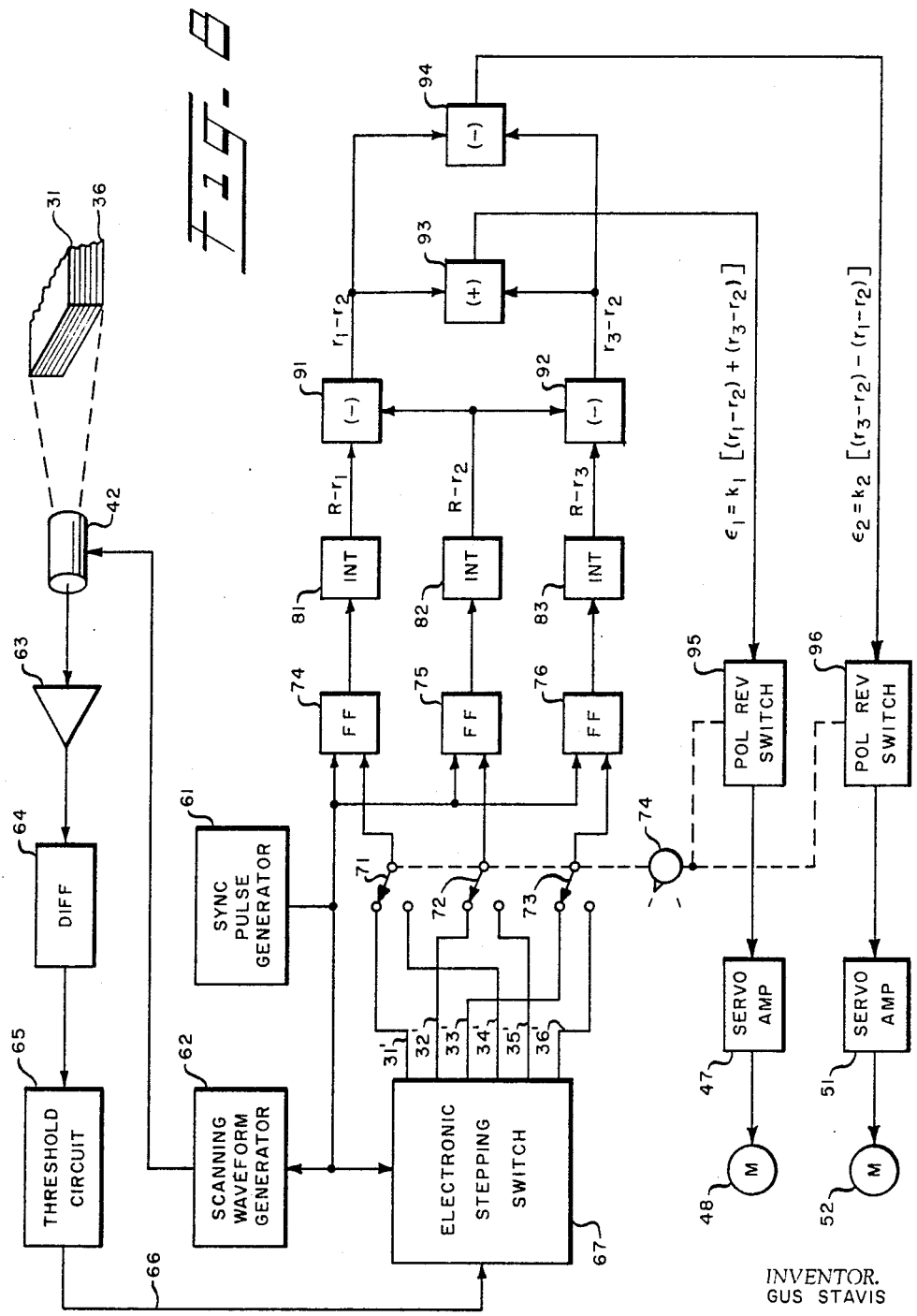

United States Patent Office 3,290,505
Patented Dec. 6, 1966

3,290,505
PHOTOSENSITIVE LUNAR TRACKER USING RADIAL SCANNING AND FIBER OPTICS
Gus Stavis, Briarcliff Manor, N.Y., assignor to General Precision, Inc., a corporation of Delaware
Filed Dec. 17, 1962, Ser. No. 245,243
11 Claims. (Cl. 250—203)

This invention relates generally to optical tracking systems and particularly to such a system which is suitable for continuously determining the direction from a vehicle to a remote body such as the moon.

If a spacecraft is to be guided to the moon or to a planetary body, it is necessary that some apparatus be provided for determining the direction to the center of the body. In the case of the moon, for example, the problem of finding the center of the lunar disc is compounded by partial illumination, scale change as the vehicle advances, the irregularity of the surface, the changing appearance of prominent features, and the great distance over which the observations must be made.

One approach might be the employment of star tracker techniques. In general, a star tracker seeks to determine the direction to a point source of light which subtends an angle well below the resolving power of the instrument. However, the moon presents a target which subtends an angle many times the resolving power and the instrument may point to any part of the lunar surface.

Another approach to the problem might be the use of image matching techniques. This approach requires the vehicle to carry a number of stored images of the surface and that the use of these images be correlated with the phase of the moon and its distance from the vehicle. At great distances the ability to resolve sufficient detail is a serious problem.

Yet another approach to the problem involves scanning techniques. The most common scanning pattern is one which is rectilinear as in the oscilloscope and in the television raster. The rectilinear scan is one of the easiest to generate and to control in quality but is not compatible with exploring the geometry of a circular object. A circular scan, spiral scan or radial scan are much more appropriate but are very difficult to generate with the required precision. Additionally, problems arise as to how to detect the coincidence of interest, how to cope with partial illumination of the moon and how to accommodate scale changes.

It is an object of the present invention to provide apparatus for determining the direction to the center of a remote, inaccessible, illuminated, substantially circular or spherical body.

Another object is to provide apparatus suitable for installation aboard a spacecraft for automatically determining the direction to the center of the moon.

Another object is to provide simple apparatus requiring no critical components or circuits for determining continuously the direction toward the center of the moon.

Briefly stated, the invention employs a lens for forming an image of the moon, which image is traversed by several radial scans. However, the necessity for generating a radial scan with the necessary precision is avoided by using several bundles of optical fibres which transform radial lines of light to parallel lines of light which are then scanned by the easily generated rectangular scanning pattern. The scanning tube, such as a vidicon, and its associated circuitry measures the distance from the center of the radial scanning geometry to the edge of the image of the lunar disc as determined by each of several radial scan lines. Error signals derived from the distances so measured control servomechanisms which adjust the instrument in both azimuth and elevation to make all the distances equal. When this condition obtains, the center of the scan geometry will be superimposed on the center of the image of the lunar disc and the optical axis of the lens will point toward the center of the moon.

For a clearer understanding of the invention, reference may be made to the following detailed description and the accompanying drawing, in which:

FIGURE 1 is a schematic diagram of a coarse tracking, or acquisition mechanism;
FIGURE 2 is a diagram showing a preferred arrangement of the optical fibre bundles or strips;
FIGURE 3 is a schematic diagram of the invention;
FIGURE 4 is a diagram illustrating one orientation of the lunar image with respect to the fibre bundles;
FIGURES 5, 6, 7 and 9 are voltage waveform diagrams, useful in explaining the invention;
FIGURE 8 is a schematic diagram showing part of the apparatus of FIG. 3 in more detail; and
FIGURES 10, 11 and 12 are diagrams illustrating various other orientations of the lunar image.

The problem of determining the center of the lunar disc may be divided into two parts. First, there is the acquisition of the lunar disc image and the approximate determination of its center. The second part is a precise determination of the direction to the center of the disc.

The first or acquisition part of the problem is not a part of the present invention but a brief description of a suitable arrangement is included in order to show the setting of the invention. As shown schematically in FIG. 1, a lens 21, which may have a field of view of about 10° x 10°, forms an image 22 of the moon at its focal plane where there are mounted four photosensitive cells 23, 24, 25 and 26 arranged in quadrants. Opposite pairs are connected to servomechanisms 27 and 28, each comprising amplifiers, motors, etc., which position the assembly comprising the lens 21 and the photocells 23–26 in azimuth and elevation so as to place the image 22 at the center.

The second part of the problem is more difficult and is the part with which the present invention is concerned. It will be assumed hereafter that the "coarse" alignment has been achieved and that the optical axis of the "fine" tracker about to be described has been placed within the lunar disc circumference.

The "fine" tracker of the present invention uses a radial scanning technique. However, the previously mentioned difficulty in generating a radial scan having the required precision is avoided by a coordinate transformation arrangement using several bundles of optical fibers. In FIG. 2 there are shown six identical bundles, 31, 32, 33, 34, 35 and 36 each having a flat cross-section and each having one end cemented to a transparent glass plate 37 so as to form six radial lines. The bundles or strips are gently curved and the other ends arranged parallel to each other in a stack. If a tube such as a vidicon be made to scan the stack in a rectilinear fashion, it is in effect scanning the glass plate 37 in a radial manner by virtue of the coordinate transformation performed by the bundles. Adequate resolution may be achieved by making each bundle several fibres thick since fibres are readily obtainable 0.0005" or less in diameter.

Referring now to FIG. 3, there is shown a lens 41 which may, for example, have a focal length of about 20 inches which forms an image of the moon on the surface of the glass plate 37 opposite the fibre bundles. A tube 42 such as a vidicon scans the flat ends of the bundles thereby effectively making six radial scans of the image of the lunar disc. The signals generated by the tube 42 are applied to a circuit 43, to be more fully described, which generates error signals indicative of the departure of the center of the radial scan from the center of the image of the lunar disc. The lens 41, the plate 37, the fibre bundles 31–36 and the vidicon tube 42 are all fastened within a hollow cylindrical tube 44 which in turn is mounted to be rotatable about both an azimuth and an elevation axis, as shown schematically by the dotted lines 45 and 46 respectively. An azimuth error signal from the circuit 43 is applied to a servo amplifier 47 which in turn controls a motor 48 which rotates the assembly about the azimuth axis 45. Similarly, an elevation error signal from the circuit 43 is applied to a servo amplifier 51 which in turn controls a motor 52 which rotates the assembly about the elevation axis 46. When the error signals have been reduced to zero, the center of the radial scan, that is, the center of the disc 37, coincides with the center of the image of the lunar disc. At this time the fine tracking device is directed toward the center of the moon. Synchro transmitters 53 and 54 rotated in azimuth and elevation respectively generate signals which may be used to guide the vehicle.

The fibre bundles may be arranged on the plate 37 as shown in FIG. 4. They may be regarded as comprising two sets of three, one set comprising the fibres 31, 32 and 33, and the other set comprising the fibres 34, 35 and 36. At any one time only one set is used, as will be more fully explained.

If the coarse tracker has performed its function, the image of the lunar disc on the plate 37 will always include the optical axis within its circumference. One possible condition is depicted in FIG. 4 wherein the moon is assumed to be but partially illuminated, the light portion appearing as the cross-hatched crescent. The distances along the scan lines, that is, along the fibre bundles, from the center of the plate 37 to the edge of the lunar disc are denoted $r_1$, $r_2$, and $r_3$ while the length of the scan line, that is, the radius of the plate 37, is denoted by R. It is obvious that if $r_1 = r_2 = r_3$, the center of the lunar image will coincide with the center of the plate 37.

The output of the vidicon tube 42 corresponding to its scan of the bundles 31, 32 and 33, respectively, resembles the waveforms shown in FIG. 5. The rise of voltage is gradual as the beam scans the image by going towards the circumference because the illumination at the lunar terminator is graduated due to lunar surface roughness. On the other hand, the transition in voltage corresponding to scanning across the edge of the lunar disc is very abrupt corresponding to the high contrast between the moon and dark sky.

Figure 5:
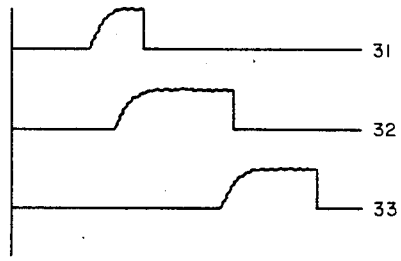
Figure 7:
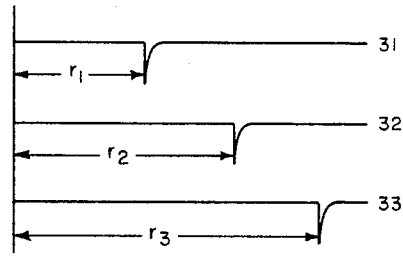
FIG. 7 shows the result of passing each of the waveform of FIG. 6 through a threshold circuit which separates the pulses from the background noise. The positions of these pulses correspond to the distances $r_1$, $r_2$ and $r_3$ from the optical center to the sampled edges of the lunar disc.
Figure 6:
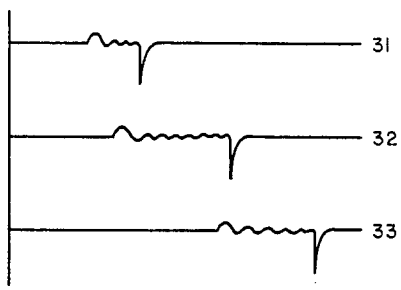
FIG. 6 shows the waveforms resulting from differentiating the output of the vidicon tube 42. Large spikes occur as the scan crosses the edge of the disc.

Referring now to FIG. 8, which illustrates in block schematic form the details of the signal processing circuit 43, there is shown a synchronizing pulse generator or timer 61 which generates a series of substantially equally spaced pulses for controlling and synchronizing the operation of the entire circuit. The generator 61 is connected to and controls a scanning waveform generator 62 which generates and applies to the vidicon tube 42 the waveforms necessary to cause the tube 42 to scan the ends of the strips 31–36 sequentially. If the lunar image be oriented as in FIG. 4, the video signal from the tube 42 as it scans the strips 31, 32 and 33 will be as shown in FIG. 5 while as the strips 34, 35 and 36 are scanned there will be only a small noise output. The signal is increased in amplitude by an amplifier 63 and passed through a differentiating circuit 64, making its form similar to that shown in FIG. 6. The signal next passes through a threshold circuit 65 which substantially eliminates the ripples due to noise, leaving only the sharp spikes as shown in FIG. 7. The signal is next led via a conductor 66 to an electronic stepping switch 67. The switch 67 is of conventional construction and, under the control of the synchronizing pulse generator 61, connects the conductor 66 successively to the conductors 31', 32', 33', 34', 35' and 36' so that the video signal representing the scan of the fibre bundles 31–36 (as modified by the circuits 64 and 65) appears sequentially on the conductors 31' to 36' respectively.

As previously mentioned only one set of three fibre bundles, either the set comprising bundles 31, 32 and 33 or the set comprising bundles 34, 35 and 36, is used at any one time. Selection is based on the orientation of the apparatus and the phase of the moon as will be more fully explained. The conductors 31', 32' and 33' are connected to corresponding stationary contacts of three single-pole double-throw switches 71, 72 and 73 which are mechanically connected for simultaneous operation by means of a knob 74. The conductors 34, 35 and 36 are connected to the other stationary contacts of the switches 71, 72 and 73. Each moveable arm of these switches is connected to the "set" input terminal of one of three flip-flop circuits 74, 75 and 76 so that upon the occurrence of a voltage pulse such as illustrated in FIG. 7 the corresponding flip-flop circuit is set or triggered to place a voltage on its output conductor. Each flip-flop circuit also has a "reset" input terminal, all of which are connected together and to the synchronizing pulse generator 61 so that at the end of each scan all of the flip-flop circuits 74, 75 and 76 are "reset" thereby removing any voltages from the output conductors.

Figure 9:
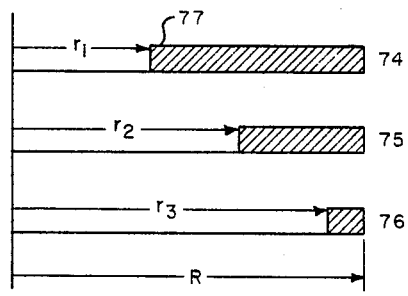

FIGURE 9 shows the voltages at the output of the flip-flops 74, 75, 76. Consider the flip-flop 74, for example. The curve 77 shows that the voltage is initially at a reference level, corresponding to the "reset" condition. Upon the occurrence of a pulse on the conductor 31' the flip-flop 74 is "set" causing the voltage to rise abruptly to a predetermined level where it remains until the end of the scan at which time a pulse from the generator 61 "resets" the circuit. The length of that portion of the curve corresponding to the higher voltage level represents the distance from the edge of the image of the lunar disc to the edge of the plate 37, that is, $R-r_1$. Since the height of this portion of the curve is uniform, the area under this portion (cross-hatched in FIG. 9) also represents the distance $R-r_1$. Accordingly, the output of the flip-flop circuit 74 is led to an integrating circuit 81 which develops a voltage indicative of the distance $R-r_1$. Similarly, the flip-flop circuits 75 and 76 are connected to integrators 82 and 83, respectively, which develop voltages indicative of the distances $R-r_2$ and $R-r_3$, respectively.

Each of the integrators 81, 82 and 83 may comprise a resistance-capacitance network with suitable charging and discharging time constants so that the output of each circuit represents the average value of the potential of the output of the flip-flop circuits 74, 75 and 76, respectively, averaged over one frame, that is, over the time required to scan all six fibre bundles. Each of the voltages is, accordingly, indicative of the length of one of the pulses shown in FIG. 9.

The output of the integrator 81, indicative of $R-r_1$, is subtracted from the output of the integrator 82, indicative of $R-r_2$, by a subtraction circuit 91 which thereby develops a voltage indicative of $r_1-r_2$. Similarly the output of the integrator 83 is subtracted from the output of the integrator 82 in a circuit 92 to obtain a voltage indicative of $r_3-r_2$. These voltages in turn are added by a circuit 93 to obtain an azimuth error signal $$\epsilon_1 = k_1[(r_1-r_2)+(r_3-r_2)]$$

and subtracted by a circuit 94 to obtain an elevation error signal $\epsilon_2 = k_2[(r_3-r_2)-(r_1-r_2)]$. These error signals $\epsilon_1$ and $\epsilon_2$ pass through polarity reversing switches 95 and 96, respectively, to the servo amplifiers 47 and 51 which in turn control the motors 48 and 52.

Figure 1:
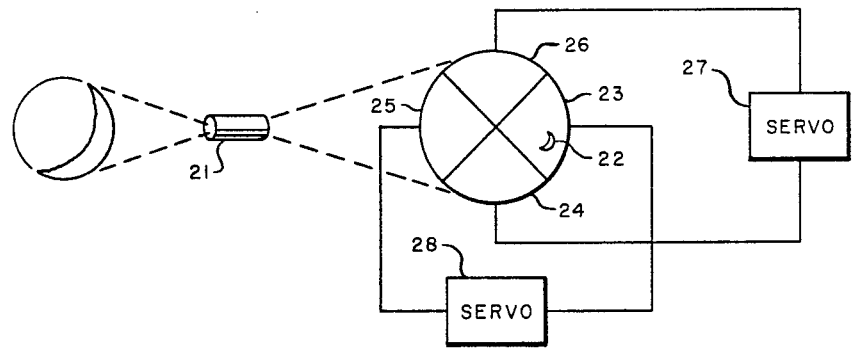
Figure 3:
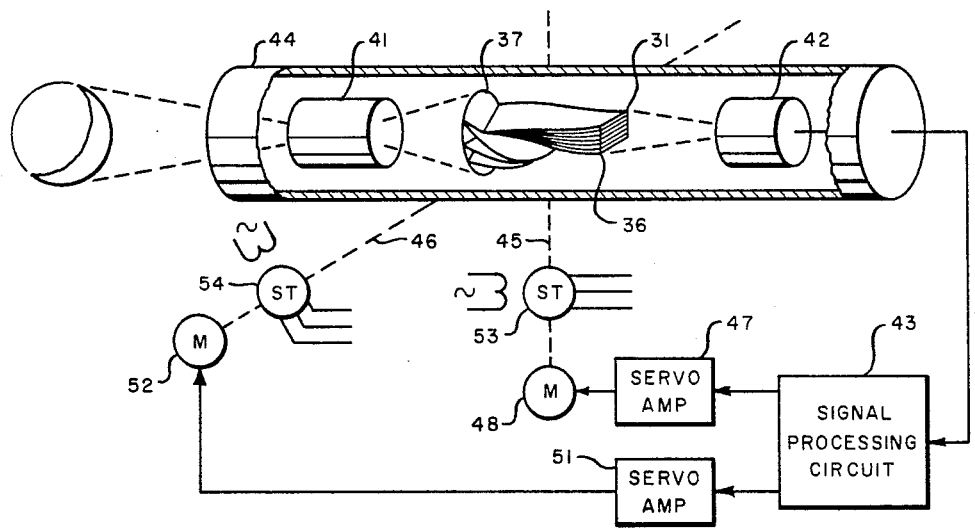
Figure 2:
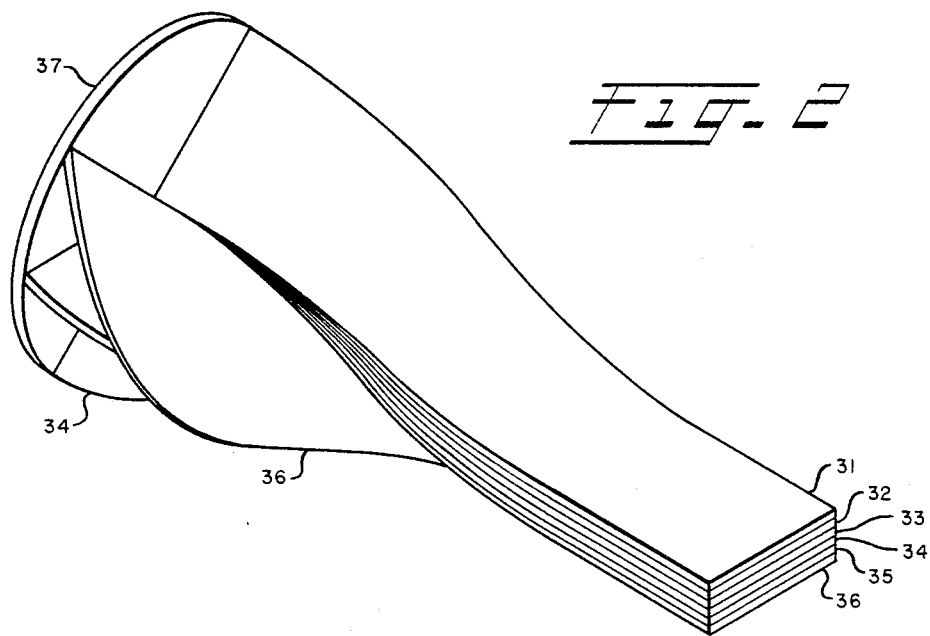
Figure 10:
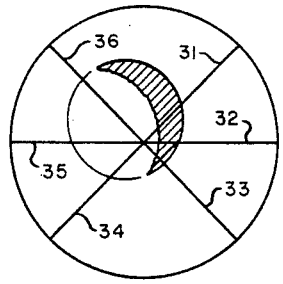
Figure 11:
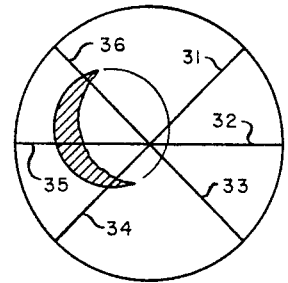
Figure 12:
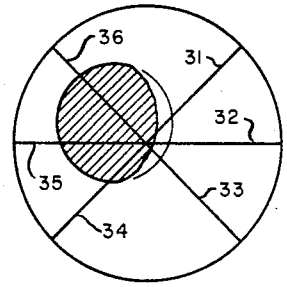
Figure 4:
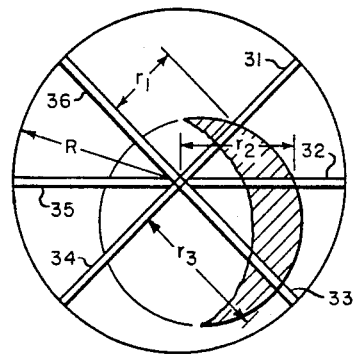

The condition depicted in FIG. 4 is but one of many possible cases of lunar phase and position. Since even in extreme crescent phase there is one hundred and eighty degrees of visible crescent, the bundles 31, 32 and 33 are capable of operating for rather large angles of orientation, such as that shown in FIG. 10. However, if the crescent is reversed, as in FIG. 11, or if gibbous phase be encountered as in FIG. 12, the bundles 34, 35 and 36 must be used. The change is made simply by operating the switches 71, 72 and 73 to the positions opposite to that shown in the drawing. The switches could be operated automatically by a programmed ephemeris but for illustrative purposes they are shown as being operated manually by the knob 74. Since the scanning operation is thereby changed from right to left and from downward to upward as viewed in FIG. 4, it is necessary that the error signals be reversed in polarity. Accordingly, the polarity reversing switches 95 and 96 are operated simultaneously with the switches 71, 72 and 73, as indicated schematically by the dotted line connections.

From the foregoing description it is apparent that the present invention is capable of determining automatically and continuously the direction to the center of an illuminated sphere or disc such as the moon. It is to be noted that the present invention inherently discriminates against other bright stars or planets. This may be seen from a consideration of FIGS. 7, 8 and 9. If the bright star is sensed by the scan of bundle 31 then there will be a second pulse on that line after the one shown in FIG. 7. However, the pulse derived from the scan of the lunar disc serves to "set" the flip-flop 74 of FIG. 8 rendering it insensitive to any further pulsing until the end of the scan line. Hence unless the bright star or planet lies tangent to the lunar disc on the radius being sampled (an improbable situation which could not be long-lived) such a star will not be seen by the system.

Although a specific embodiment of the invention has been described for illustrative purposes, many modifications will occur to those skilled in the art. It is, therefore, desired that the protection afforded by Letters Patent be limited only by the true scope of the appended claims.

What is claimed is:

1. Apparatus for aligning the axis of an optical system with the center of a disc which may be but partially visible, comprising,
    means including said optical system for forming an image of said disc,
    means for effectively measuring the distance from the axis of said optical system along a plurality of individual radial lines to the image of the edge of said disc, and
    means for adjusting the orientation of said optical system to make the individual distances along said radial lines equal,
    whereby the axis of said optical system is aligned with the center of said disc.

2. Apparatus for determining the direction to the center of a remote, inaccessible, illuminated, spherical body, comprising,
    means for forming an image of said body,
    fibre optic means for transferring light falling on a plurality of radial lines of said image to a plurality of parallel lines,
    means for scanning said parallel lines sucessively and for generating individual signals the magnitudes of which are indicative of the individual light intensities along the length of each line so scanned.
    whereby the effect is that of scanning said image along radial lines, and whereby the magnitude of each of said signals varies abruptly as the image of the edge of said body is scanned,
    means for comparing the elapsed times from the beginning of each scan line to the occurrence of the corresponding abrupt magnitude variation, and
    means for adjusting the orientation of said image forming means to make said elapsed times equal.

3. Apparatus for determining the direction to the center of a remote, inaccessible, partially illuminated, spherical body, comprising,
    an optical system for forming an image of said body,
    a transparent plate positioned in the focal plane of said system for receiving said image,
    a plurality of strips each comprising a plurality of optical fibres,
    one end of each of said strips being fastened to said plate on the side remote from said optical system,
    each strip being positioned on a different radial line with the edges of said strips touching each other and clustered about the optical axis of said system,
    each strip being gently twisted along its length,
    the other ends of said strip being arranged in the same plane parallel to each other in a rectangular stack,
    means for scanning said other ends successively in a rectilinear fashion and for generating first signals the variations of which are indicative of the variations in light intensity along said ends.
    whereby the effect is that of scanning said image along radial lines and whereby each of said first signals varies abruptly as the image of the edge of said body is scanned,
    means controlled by said first signals for generating second signals indicative of the length from the optical axis to the edge of said image along said one end of each of said strips,
    means controlled by said second signals for generating two error signals indicative of the departure in two coordinates of said axis of said optical system from the center of said body, and
    means controlled by said error signals for adjusting the orientation of said optical system to reduce said error signals to zero.

4. A scanning system for determining the direction to the center of a circular object, the perimeter of which is illuminated in whole or in part comprising,
    a plurality of bundles of optical fibers, each bundle being in the form of a ribbon having first and second ends and having width and thickness at each said first end and each said second end respectively,
    said plurality of bundles arranged so that said first ends of each of said ribbons collectively form a configuration substantially similar to the spokes of a wheel, with common edges of each of said first ends joined at the axis thereof,
    means for projecting an image of the illuminated part of said circular object so that part of the image so projected, falls on at least part of said first ends of at least two said ribbons,
    said second ends of ribbons arranged in parallel planes with respect to each other, in a rectangular stack with one side of the rectangular stack formed by the edge of said second ends corresponding to the edge of said first ends joined at said axis,
    means for scanning said second end of each of said ribbons in progressive order, and
    means responsive to an illuminated section of at least two said ribbons so scanned for orienting said axis to the center of said circular object.

5. A scanning system as in claim 4 and in which the width of each of said first ends are uniform in length.

6. A scanning system as in claim 4 and in which said means for scanning includes means for cyclically scanning each said ribbon, in progressive order, along its respective width, commencing at said one side of said rectangular stack.

7. A scanning system as in claim 4 and in which said responsive means includes servo means for positioning said axis to the center of said circular object.

8. A scanning system as in claim 4 and in which said responsive means includes means for arresting said responsive means after having responded to an illuminated section of any one of said second ends so as to prevent two responses by said responsive means during scanning of any one of said second ends and means for releasing said responsive means, so arrested, at the completion of scanning of said any one of said second ends.

9. A scanning system for determining the direction to the center of a circular object, the perimeter of which is illuminated in whole or in part comprising:

a transparent plate having first and second surfaces and centered on an axis, means for projecting an image of said illuminated object on to said first surface, a plurality of bundles of optical fibers, each bundle being in the form of a ribbon having first and second ends between the length thereof and having thickness along the width of said ribbon, said first ends of said ribbons arranged so as to collectively form a configuration substantially similar to the spokes of a wheel, said first ends of said ribbons being fastened to said second surface of said plate with one edge of the said first ends of each of said ribbons joined substantially at the center of said plate, said ribbons being for individually transmitting a different part of said image projected on said plate from said first end to said second end in accordance with the position of said image on said first surface, said second ends of said ribbons arranged in parallel planes with respect to each other in a rectangular stack with the common edges of each said ribbon forming one side of the rectangular stack, means for scanning said second end of each of said ribbons, in progressive order, commencing at a common end of said rectangular stack, and means responsive to that part of the said image so transmitted by successsively scanned ribbons for orienting said axis to the center of said circular object.

10. A scanning system as in claim 9 and in which said responsive means includes servo means for orienting said axis, on which said transparent plate is so centered, to the center of said object.

11. A scanning system as in claim 9 and in which said responsive means includes means for setting said responsive means after having once responded during the scanning of any one of said second ends so as to prevent more than one response during the scanning of any one of said second ends and means for resetting said responsive means, having been so set, at the completion of scanning said any one of said second ends.

References Cited by the Examiner

UNITED STATES PATENTS

| 1,751,584 | 3/1930 | Hansell | 250—227 X |
| 2,122,750 | 7/1938 | Nicolson | 250—227 X |
| 2,698,433 | 12/1954 | Ringoen | 250—203 X |
| 3,080,485 | 3/1963 | Saxton | 250—203 |
| 3,090,583 | 5/1963 | Behun et al. | 250—203 X |
| 3,104,324 | 9/1963 | Rabinow | 250—227 |

FOREIGN PATENTS 780,976    8/1957    Great Britain.

RALPH G. NILSON, *Primary Examiner.*

ARCHIE R. BORCHELT, *Examiner.*

E. STRICKLAND, M. A LEAVITT, *Assistant Examiners.*